US010915772B2

(12) United States Patent
Yoon et al.

(10) Patent No.: US 10,915,772 B2
(45) Date of Patent: Feb. 9, 2021

(54) APPARATUS AND METHOD FOR REGISTERING FACE POSE FOR FACE RECOGNITION

(71) Applicant: ELECTRONICS AND TELECOMMUNICATIONS RESEARCH INSTITUTE, Daejeon (KR)

(72) Inventors: Ho-Sub Yoon, Daejeon (KR); Jae-Yoon Jang, Daejeon (KR); Jae-Hong Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 111 days.

(21) Appl. No.: 16/227,327

(22) Filed: Dec. 20, 2018

(65) Prior Publication Data
US 2020/0167583 A1 May 28, 2020

(30) Foreign Application Priority Data

Dec. 27, 2017 (KR) .................. 10-2017-0181163
Nov. 23, 2018 (KR) .................. 10-2018-0146791

(51) Int. Cl.
*G06K 9/00* (2006.01)
*G06K 9/62* (2006.01)
*G06T 7/70* (2017.01)

(52) U.S. Cl.
CPC ..... *G06K 9/00926* (2013.01); *G06K 9/00228* (2013.01); *G06K 9/6215* (2013.01); *G06T 7/70* (2017.01); *G06T 2207/30201* (2013.01)

(58) Field of Classification Search
None
See application file for complete search history.

(56) References Cited

U.S. PATENT DOCUMENTS 6,707,933 B1* 3/2004 Mariani ............. G06K 9/00228
340/5.83
8,750,576 B2 6/2014 Huang et al.
(Continued)

FOREIGN PATENT DOCUMENTS

EP  2 555 159     2/2013
JP  4675492       4/2011
(Continued)

OTHER PUBLICATIONS

Head pose estimation in computer vision: a survey, by Murphy-Chutorian et al, IEEE vol. 31, No. 4, Apr. 2009 (Year: 2009).*

*Primary Examiner* — Vikkram Bali
(74) *Attorney, Agent, or Firm* — Kile Park Reed & Houtteman PLLC

(57) ABSTRACT

Disclosed herein are an apparatus and method for registering face poses for face recognition. The apparatus includes a face detection unit for detecting the face of a user from an image including the face of the user; a pose recognition unit for recognizing the face pose of the face of the user based on the degree of rotation of the face of the user; a registration interface unit for providing an interface for showing information about whether the face poses of the face of the user are registered; and a face registration unit for registering the face pose of the face of the user when the face pose of the face of the user is recognized as an unregistered face pose based on the interface.

15 Claims, 11 Drawing Sheets

(56) References Cited

U.S. PATENT DOCUMENTS

| | | |
|---|---|---|
| 8,818,034 B2 | 8/2014 | Zhang et al. |
| 9,298,976 B2 | 3/2016 | Je et al. |
| 9,495,580 B2 | 11/2016 | Kim et al. |
| 2002/0135618 A1* | 9/2002 | Maes ............... G10L 15/24 715/767 |
| 2005/0105805 A1* | 5/2005 | Nicponski ......... G06K 9/6211 382/216 |
| 2014/0254891 A1* | 9/2014 | Lee .................. G06K 9/00926 382/118 |

FOREIGN PATENT DOCUMENTS

| | | |
|---|---|---|
| KR | 10-1030518 | 4/2011 |
| KR | 10-1089287 | 12/2011 |
| KR | 10-1089288 | 12/2011 |
| KR | 10-1180471 | 9/2012 |
| KR | 10-1214732 | 12/2012 |
| KR | 10-1370514 | 3/2014 |

\* cited by examiner

100

APPARATUS AND METHOD FOR REGISTERING FACE POSE FOR FACE RECOGNITION

CROSS REFERENCE TO RELATED APPLICATIONS

This application claims the benefit of Korean Patent Application No. 10-2017-0181163, filed Dec. 27, 2017, and No. 10-2018-0146791, filed Nov. 23, 2018, which are hereby incorporated by reference in their entirety into this application.

BACKGROUND OF THE INVENTION

1. Technical Field

The present invention relates generally to an apparatus and method for registering and recognizing a face based on face poses. More particularly, the present invention relates to a system and method for automatically registering images of faces in various poses using a camera installed in a mobile phone, a PC, or the like and for recognizing a face based thereon.

2. Description of the Related Art

The conventional method for recognizing a face from face poses using a camera takes an approach in which, after some images that capture a full face or a side profile are arbitrarily selected and registered, when the image of the face to be recognized is input, the image is compared with all of the multiple registered face images, and the face, the image of which has the highest similarity to the input image, is determined to be the recognized face. Alternatively, a 3D face image is generated from images successively capturing a side profile in various poses when the face is registered, the face pose that is most similar to the face pose in an input image is generated from the 3D face image, and the face is recognized based thereon.

The first approach, in which multiple side profile images are registered and used in order to recognize a face, is disadvantageous in that a user is forced to take predefined poses when registration is performed, and in that, because only five or ten pose variations are registered, face recognition performance is not improved when the image of a face in a new pose, other than the predefined poses, is input.

The second approach is advantageous in that it is robust to pose variation, but is disadvantageous in that, unless a perfect 3D face model is generated using a precise 3D sensor, the face image to be registered for recognition may have a shape that differs from the actual face. Furthermore, even though it is possible to accurately generate a 3D face model, because it is necessary to generate a 3D face model from face images and extract features therefrom, the time taken to recognize a face may be longer as the number of registered images increases.

The above-described information about the related art has been retained by the inventors for the purpose of developing the present invention or was obtained during the process of developing the present invention. Also, it should be appreciated that this information did not necessarily belong to the public domain before the patent filing date of the present invention.

DOCUMENTS OF RELATED ART (Patent Document 1) Korean Patent No. 10-1089287.

SUMMARY OF THE INVENTION

An object of the present invention is to provide an apparatus and method for registering face poses for face recognition, in which multiple pieces of face information are registered based on face poses and a face is recognized using the face information.

Another object of the present invention is to provide an apparatus and method for registering face poses for face recognition, in which multiple pieces of face information corresponding to different face poses are automatically registered using input images including a user.

A further object of the present invention is to provide an apparatus and method for registering face poses for face recognition, in which whether a face is registered is determined using face information related to the face pose that is similar to the face pose of a user shown in an input image, among multiple registered pieces of face information.

In order to accomplish the above objects, an apparatus for registering face poses for face recognition according to an embodiment of the present invention includes a face detection unit for detecting a face of a user from an image including the face of the user; a pose recognition unit for recognizing a face pose of the face of the user based on a degree of rotation of the face of the user; a registration interface unit for providing an interface for showing information about whether face poses of the face of the user are registered; and a face registration unit for registering the face pose of the face of the user when the face pose of the face of the user is recognized as an unregistered face pose based on the interface.

Here, the registration interface unit may display face pose points indicating face poses, corresponding to a preset number of degrees by which the face of the user is rotated, through the interface.

Here, the registration interface unit may set the face pose points on a coordinate plane such that the face pose points have a preset distance therebetween that is based on the preset number of degrees by which the face of the user is rotated.

Here, the registration interface unit may show whether or not face poses are registered by marking the face pose points corresponding thereto on the coordinate plane through the interface.

Here, the registration interface unit may mark a face pose point corresponding to a registered face pose with a first state in order to show that the corresponding face pose is registered, and may mark a face pose point corresponding to an unregistered face pose with a second state in order to show that the corresponding face pose is not yet registered through the interface.

Here, the registration interface unit may display a face pose reference line that matches a line of sight of the user through the interface based on information about the line of sight recognized from the face of the user.

Here, the registration interface unit may change a state with which a face pose point corresponding to an unregistered face pose is marked when a target point, to which the face pose reference line points, comes close to the face pose point corresponding to the unregistered face pose within a preset distance, among the face pose points.

Here, the face registration unit may register the face pose of the face of the user at the face pose point corresponding to the unregistered face pose when a state in which the target point is located close to the corresponding face pose point within the preset distance is maintained for a preset time period.

Here, the face registration unit may compare the face pose of the face of the user to be registered at the face pose point corresponding to the unregistered face pose with the face pose of the face of the user that is registered at the face pose point corresponding to the registered face pose using the similarity therebetween, and may register the face pose of the face of the user at the face pose point corresponding to the unregistered face pose only when a difference between a degree of rotation of the face pose to be registered and a degree of rotation of the face pose that is registered is equal to or greater than a preset threshold.

Here, the registration interface unit may change the second state to the first state when the face pose of the face of the user is registered at the face pose point corresponding to the unregistered face pose.

Also, in order to accomplish the above objects, a method for registering face poses for face recognition, performed by an apparatus for registering face poses for face recognition, according to an embodiment of the present invention includes detecting a face of a user from an image including the face of the user; recognizing a face pose of the face of the user based on a degree of rotation of the face of the user; providing an interface for showing information about whether face poses of the face of the user are registered; and registering the face pose of the face of the user when the face pose of the face of the user is recognized as an unregistered face pose based on the interface.

Here, providing the interface may be configured to display face pose points indicating face poses, corresponding to a preset number of degrees by which the face of the user is rotated, through the interface.

Here, providing the interface may be configured to set the face pose points on a coordinate plane such that the face pose points have a preset distance therebetween that is based on the preset number of degrees by which the face of the user is rotated.

Here, providing the interface may be configured to show whether or not face poses are registered by marking the face pose points corresponding thereto on the coordinate plane through the interface.

Here, providing the interface may be configured to mark a face pose point corresponding to a registered face pose with a first state in order to show that the corresponding face pose is registered and to mark a face pose point corresponding to an unregistered face pose with a second state in order to show that the corresponding face pose is not yet registered through the interface.

Here, providing the interface may be configured to display a face pose reference line that matches a line of sight of the user through the interface based on information about the line of sight recognized from the face of the user.

Here, providing the interface may be configured to mark a target point to which the face pose reference line points with a third state on the coordinate plane through the interface.

Here, providing the interface may be configured to change a state with which a face pose point corresponding to an unregistered face pose is marked when the target point comes close to the face pose point corresponding to the unregistered face pose within a preset distance, among the face pose points.

Here, registering the face pose may be configured to register the face pose of the face of the user at the face pose point corresponding to the unregistered face pose when a state in which the target point is located close to the corresponding face pose point within the preset distance is maintained for a preset time period.

Here, registering the face pose may be configured to change the second state to the first state when the face pose of the face of the user is registered at the face pose point corresponding to the unregistered face pose.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
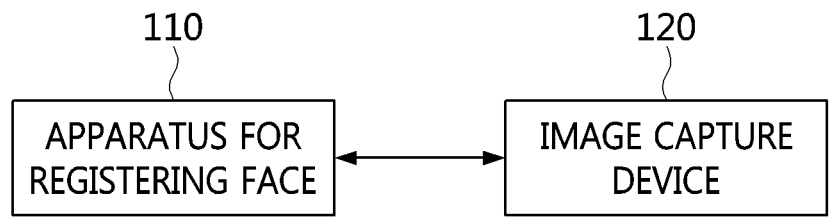
FIG. 1 is a view that shows the configuration of a system for registering face poses for face recognition according to an embodiment of the present invention.

Because the present invention may be variously changed and may have various embodiments, specific embodiments will be described in detail below with reference to the attached drawings. The effects and features of the present invention and methods of achieving them will be apparent from the following exemplary embodiments, which will be described in more detail with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

However, the present invention is not limited to the embodiments to be described below, and all or some of the embodiments may be selectively combined and configured, so that the embodiments may be modified in various ways. It will be understood that, although the terms "first," "second," etc. may be used herein to describe various elements, these elements are not intended to be limited by these terms. These terms are only used to distinguish one element from another element. Also, a singular expression includes a plural expression unless a description to the contrary is specifically pointed out in context. Also, it should be understood that terms such as "include" or "have" are merely intended to indicate that features, components, parts, or combinations thereof are present, and are not intended to exclude the possibility that one or more other features, components, parts, or combinations thereof will be present or added.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that shows the configuration of a system 100 for recognizing a face based on face poses according to an embodiment of the present invention.

Referring to FIG. 1, in the system 100 for recognizing a face based on face poses according to an embodiment of the present invention, an apparatus 110 for registering face poses for face recognition is connected with an image capture device 120.

The apparatus 110 for registering face poses for face recognition according to an embodiment of the present invention receives an image including a user's face from the image capture device 120, detects the face from the image, recognizes the pose of the detected face, and automatically registers face information in consideration of the recognized face pose or recognizes the face using already registered face information.

Here, face information to be registered may include color information, pixel information, feature information, and the like pertaining to the detected face. Also, recognition of a face may be determination of whether the face included in the input image matches one of already registered faces. That is, face recognition may have the same meaning as face authentication.

The image capture device 120 is a device that is capable of capturing an image including the face of a user.

For example, the image capture device 120 may include a camera, a camcorder, or the like.

Here, the image capture device 120 may be a device that is not capable of measuring depth information or a device that is capable of measuring depth information.

In an alternative embodiment, the image capture device 120 may be included in the apparatus 110 for registering face poses for face recognition.

Figure 2:
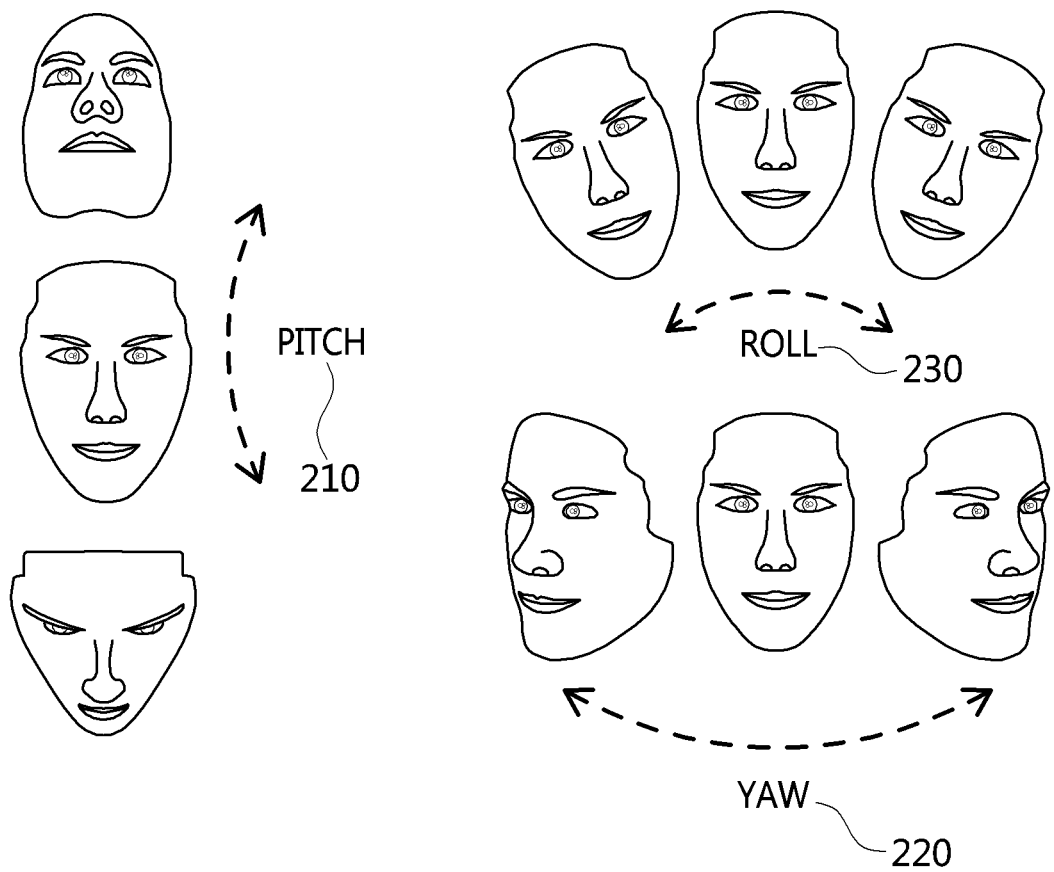
FIG. 2 is a view that shows an example of information corresponding to a face pose.

FIG. 2 is a view that shows an example of information corresponding to a face pose.

Referring to FIG. 2, a face pose may be represented as rotation about three axes, which may include pitch 210, yaw 220, and roll 230.

Based on the image capture device (120 in FIG. 1), when the roll 230 of a face is changed, there is little difference in an extracted face area. Also, the roll 230 may be offset by rotating the extracted face area. However, a change in the pitch 210 or the yaw 220 of the face makes a big difference in the extracted face area. Therefore, the pitch 210 and the yaw 220 are important factors affecting a face pose.

Accordingly, the apparatus 110 for registering face poses for face recognition according to an embodiment of the present invention may recognize a face pose by determining the pitch 210 and the yaw 220 of a user's face. For example, when a face is detected from an image including the face of a user, it may be recognized that the face of the user is rotated up by 10 degrees and rotated to the right by 5 degrees by analyzing the detected face, whereby (10 degrees, 5 degrees) may be stored as face pose information.

Figure 3:
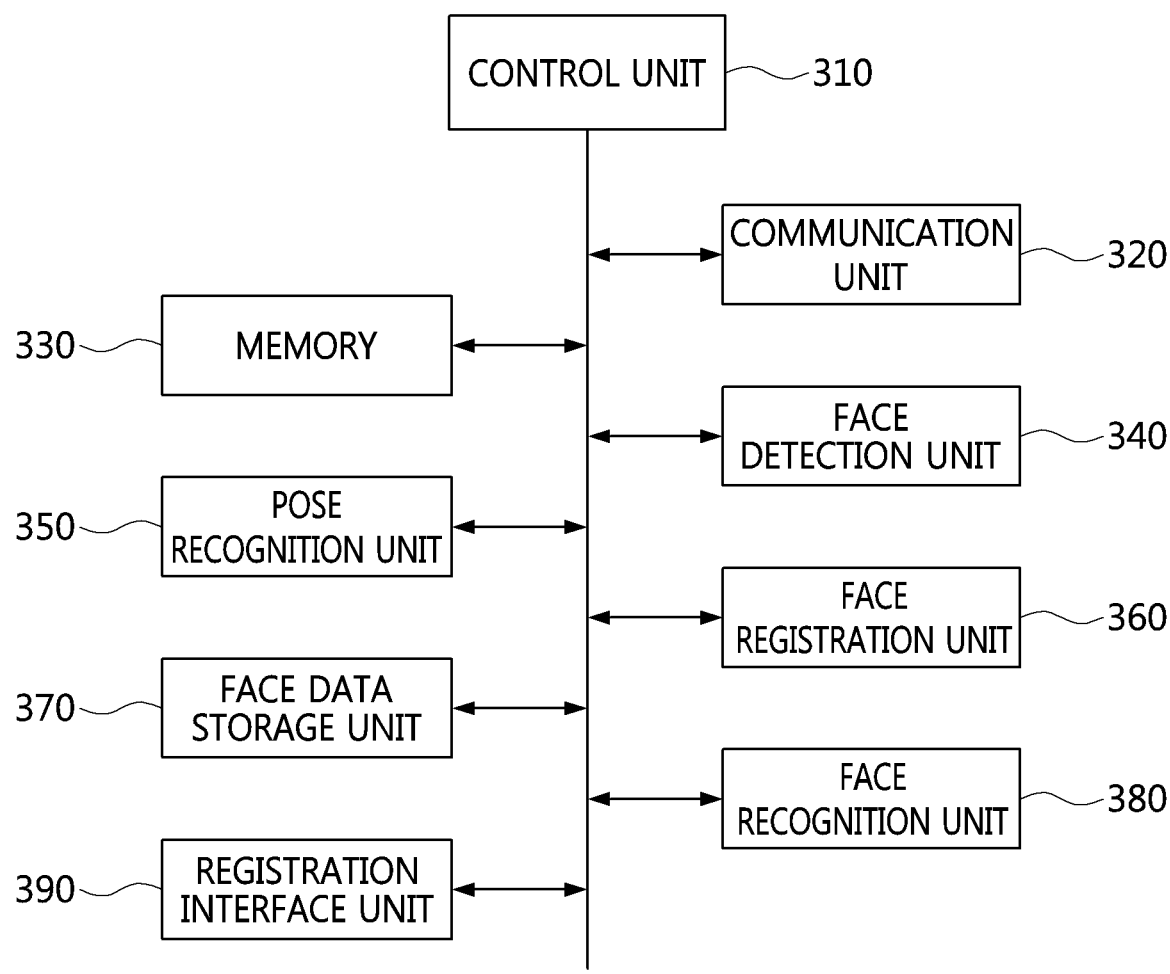
FIG. 3 is a block diagram that shows an example of the apparatus for registering face poses for face recognition illustrated in FIG. 1.

FIG. 3 is a block diagram that shows an example of the apparatus 110 for registering face poses for face recognition illustrated in FIG. 1.

Referring to FIG. 3, the apparatus 110 for registering face poses for face recognition according to an embodiment of the present invention includes a control unit 310, a communication unit 320, memory 330, a face detection unit 340, a pose recognition unit 350, a face registration unit 360, a face information storage unit 370, a face recognition unit 380, a registration interface unit 390, and the like.

Specifically, the control unit 310 is a kind of central processing unit, and controls the overall process of recognizing a face based on face poses. That is, the control unit 310 may provide various functions by controlling the face detection unit 340, the pose recognition unit 350, the face registration unit 360, the face information storage unit 370, the face recognition unit 380, the registration interface unit 390, and the like.

Here, the control unit 310 may include all kinds of devices capable of processing data, such as a processor or the like. Here, the term 'processor' may indicate, for example, a data-processing device embedded in hardware, which has a circuit physically structured for performing functions represented as code or instructions included in a program. Examples of such a data-processing device embedded in hardware may include processing devices such as a microprocessor, a central processing unit (CPU), a processor core, a multiprocessor, an application-specific integrated circuit (ASIC), a field-programmable gate array (FPGA), and the like, but the present invention is not limited thereto.

The communication unit 320 provides a communication interface that is necessary to send and receive signals between the apparatus (110 in FIG. 1) for registering face poses for face recognition and an image capture device (120 in FIG. 1).

Here, the communication unit 320 may be a device including hardware and software that are necessary in order to send and receive signals, such as control signals or data signals, to and from another network device through wired/wireless connection therewith.

Here, the communication unit 320 may receive an image including a user's face from the image capture device (120 in FIG. 1).

The memory 330 functions to temporarily or permanently store data processed by the control unit 310. Here, the memory 330 may include magnetic storage media or flash storage media, but the present invention is not limited thereto.

The face detection unit 340 detects the face of a user from an image including the face of the user.

Here, the face detection unit 340 may detect a face by distinguishing the area of a user's face from a background of the image.

Here, the face detection unit 340 may acquire feature information or landmark information from the area of the user's face. For example, 68 pieces of landmark information may be acquired from the user's face.

Here, the face detection unit 340 may recognize the roll of the face based on the positions of two eyes, and may correct the user's face through rotation such that the face is not tilted to the left or right.

The pose recognition unit 350 acquires pose information by recognizing the pose of the detected face.

Here, the pose recognition unit 350 may acquire pose information by recognizing the pitch and the yaw of the detected face. For example, the pitch may be represented using the angle by which the face is rotated up or down, in which case an upward direction is set to '+' and a downward direction is set to '−'. Also, the yaw may be represented using the angle by which the face is rotated to the left or right, in which case a rightward direction is set to '+' and a leftward direction is set to '−'. Here, the pitch and the yaw may be represented as a pair comprising a pitch angle and a yaw angle, that is, (a pitch angle, a yaw angle).

Here, the pose recognition unit 350 may recognize a face pose in consideration of the line of sight in the detected face.

The face registration unit 360 registers the face information of a user when an operation mode is a face registration mode.

Here, the face registration unit 360 may register a preset number of pieces of face information, and the respective pieces of face information relate to different face poses.

Here, the face registration unit 360 registers face information in consideration of a face pose, and the face information may include face pose information.

Here, the face registration unit 360 may automatically and successively register multiple pieces of face information by extracting the same from an input image. That is, the face recognition unit may recognize the face pose of a user from an image in which the face pose of the user changes, and may automatically register multiple pieces of face information in consideration of the changing face pose. In particular, the number of pieces of face information to be registered may be variously set depending on variables such as the importance of face recognition performance, the current recognition speed, the registration speed, and the like.

Here, the face registration unit 360 may set a time limit for a face registration process. If the number of pieces of face information does not reach the number of pieces of face information to be registered within the given time limit, the corresponding face registration process may be terminated, and it may be required to perform a new face registration process. For example, the time limit may be set to 30 seconds.

Here, in order to automatically register a face, the face registration unit 360 may compare the current face pose of a user shown in the image with the face pose of face information that has already been registered in the current registration process and register the current face information as new face information when the difference between the two face poses is greater than a preset threshold. This process may be represented as the following Pseudocode 1. For example, when the difference between the pitch angles of the two face poses is greater than n degrees or when the difference between the yaw angles of the two face poses is greater than n degrees, the current face information may be registered as new face information. Here, 'n', which is the threshold for the difference between angles, may be set to a different value depending on the resolution of the input image or the processing performance of a processor.

| PSEUDOCODE 1 |
|---|
| R_count = the number of pieces of face information registered up to the present time<br>For (i = 0; i < R count; i++) {<br>  Distance_Pitch = abs (Pitch(input) − Pitch(i));<br>  Distance_Yaw = abs (Yaw(input) − Yaw(i));<br>  If (Distance Pitch > Th_angle or Distance_Yaw > Th_angle) {<br>    Register New Face( );<br>    R_count++;<br>  }<br>} |

When a face image is input, the algorithm of Pseudocode 1 compares the current face pose of the face image with the face pose of each of pieces of face information registered so far, and determines that the current face pose is a new face pose and registers face information corresponding thereto when the difference between the pitch angles of the two face poses or the difference between the yaw angles thereof is greater than a preset threshold. If the above condition is not satisfied, the corresponding face information is not registered.

Here, in order to automatically register face information, the face registration unit 360 compares the current face pose of a user shown in an image with face poses that have not yet been registered, among predefined face poses that should be registered. Here, when the difference between the two face poses is less than a preset threshold, the current face information may be registered as face information corresponding to the face pose having the highest similarity to the current face pose. In this case, because it is necessary to register face information corresponding to predefined face poses that should be registered, the face information may be registered only when both the difference between pitch angles and the difference between yaw angles are less than a threshold value.

For example, when there are nine target face poses that should be registered but have not yet been registered, specifically (0 degrees, 0 degrees), (0 degrees, 5 degrees), (0 degrees, −5 degrees), (5 degrees, 0 degrees), (−5 degrees, 0 degrees), (5 degrees, 5 degrees), (−5 degrees, 5 degrees), (5 degrees, −5 degrees), and (−5 degrees, −5 degrees), when the threshold for a difference between face poses is 1 degree, and when the current face pose shown in the image is (4.1 degrees, 0.9 degrees), (5 degrees, 0 degrees) is most similar to the current face pose (4.1 degrees, 0.9 degrees), among the target face poses that should be registered but have not yet been registered. Here, because both the difference between the pitch angles and the difference between the yaw angles are less than 1 degree, the current face information of the image may be registered as face information corresponding to the face pose (5 degrees, 0 degrees).

The face data storage unit 370 stores face data or face information registered by the face registration unit 360.

Here, the face information stored in the face data storage unit 370 may be separately stored for each user.

Here, the face data storage unit 370 may store face images, but may alternatively store only landmark information and pose information detected from the face image.

The face recognition unit 380 recognizes the face of a user from an input image, compares the same with registered face information, and determines whether the user is a registered user when the operation mode is a face recognition mode.

Here, the face recognition unit 380 selects face information to compare using face pose information about the face of a user in the input image and determines the similarity of the selected face information, thereby determining whether the user is a registered user.

Here, the face recognition unit 380 may determine the similarity using landmark information of the face.

Here, when the difference between the face pose of a user's face shown in an input image and the face pose of any of registered pieces of face information is less than a preset threshold, the face recognition unit 380 may select the corresponding face information as the target face information to be compared with the face information of the user. For example, when the face poses of nine pieces of face information that are registered are (0 degrees, 0 degrees), (0 degrees, 5 degrees), (0 degrees, −5 degrees), (5 degrees, 0 degrees), (−5 degrees, 0 degrees), (5 degrees, 5 degrees), (−5 degrees, 5 degrees), (5 degrees, −5 degrees), and (−5 degrees, −5 degrees), when a threshold for face recognition is 3 degrees, and when the current face pose of the user in an input image is (2.5 degrees, −2.5 degrees), pieces of face information corresponding to the face poses (0 degrees, 0 degrees), (5 degrees, 0 degrees), (0 degrees, −5 degrees), and (5 degrees, −5 degrees) may be selected as the target face information to be compared because the difference between the pitch angle thereof and the pitch angle of the face pose of the user and the difference between the yaw angle thereof and the yaw angle of the face pose of the user are each less than 3 degrees.

Here, the face recognition unit 380 determines the similarities between the input face information about a user and one or more pieces of target face information to compare, thereby determining whether the user is a registered user using the similarities. For example, using the maximum value, the mean value, the median value, the weighted mean value, and the like of the similarities, whether the user is a registered user may be determined. For example, when there are four pieces of target face information to be compared and when the similarities of the respective pieces of target face information are determined to be 97%, 85%, 80% and 75%, whether the user is a registered user may be determined based on 97%, which is the maximum value of the similarities. Here, if the threshold for determining that the user is a registered user is 95%, because the maximum value of the similarities is 97%, the user may be determined to be a registered user.

The registration interface unit 390 generates and provides an interface for showing the progress of face registration to a user when the operation mode is a face registration mode.

Here, the registration interface unit 390 may provide an interface that shows information about whether the face poses of the user's face are registered.

Here, the registration interface unit 390 may represent face poses corresponding to user's face information registered in the current registration process. For example, coordinate information of already registered (pitch, yaw) pairs may be represented using the format of a table or a coordinate plane.

Here, the registration interface unit 390 may display face poses that should be registered when the face poses that should be registered are predefined, and may display unregistered face poses in a manner that distinguishes the same from already registered face poses. Similarly, using the format of a table or a coordinate plane, the coordinate information of unregistered (pitch, yaw) and the coordinate information of registered (pitch, yaw) may be represented.

Here, the registration interface unit 390 may display an input image or a user's face detected therefrom along with the registered pose information. Additionally, the registration interface unit 390 may display the user's face pose shown in the input image using coordinate information. For example, when the face pose information is displayed in the format of coordinates, the current face pose of the user may be displayed on the coordinate plane, and when face information corresponding thereto is registered, the face pose may be displayed as the registered face pose.

Here, the registration interface unit 390 may display face pose points indicating face poses, corresponding to a preset number of degrees by which the face of the user is rotated, through the interface.

Here, the registration interface unit 390 may set the face pose points on the coordinate plane such that the face pose points have a preset distance therebetween that is set based on the preset number of degrees by which the face of the user is rotated.

Here, the registration interface unit 390 may show whether or not face poses are registered by marking the face pose points corresponding thereto on the coordinate plane through the interface.

Here, through the interface, the registration interface unit 390 may mark a face pose point corresponding to a registered face pose with a first state in order to show that the corresponding face pose is registered, and may mark a face pose point corresponding to an unregistered face pose with a second state in order to show that the corresponding face pose has not yet been registered.

Here, the first or second state may correspond to the color, the shape, or the effect of a dot or a marker displayed on the coordinate plane, and the first state may have a different color, shape, or effect from the second state such that a user may easily distinguish the two states from each other.

Here, the registration interface unit 390 may display a face pose reference line that matches the line of sight of the user through the interface based on information about the line of sight recognized from the face of the user.

Here, the registration interface unit 390 may mark a target point to which the face pose reference line points with a third state on the coordinate plane through the interface.

Here, the third state may have a different color, shape, or effect from the first and second states such that the user may easily distinguish the third state from the first and second states.

Here, when a user moves the line of sight using the interface so that the target point comes close to a face pose point corresponding to an unregistered face pose within a preset distance, among the face pose points, the registration interface unit 390 may change the state with which the face pose point corresponding to the unregistered face pose is marked.

Here, when the state in which the target point is located close to the face pose point corresponding to the unregistered face pose within the preset distance is maintained for a preset time period, the face registration unit 360 may register the face pose of the user's face at the face pose point corresponding to the unregistered face pose.

Here, the face registration unit 360 may compare the face pose of the user's face to be registered at the face pose point corresponding to the unregistered face pose with the face pose of the user's face that is registered at the face pose point corresponding to the registered face pose using the similarity therebetween, and may register the face pose of the user's face at the face pose point corresponding to the unregistered face pose only when the difference between the degree of rotation of the face pose to be registered and the degree of rotation of the registered face pose is equal to or greater than a preset threshold.

Here, the registration interface unit 390 may change the second state to the first state when the face pose of the user's face is registered at the face pose point corresponding to the unregistered face pose.

Accordingly, when a user registers his or her face for face recognition, the user may automatically register face information based on various face poses merely by inputting an image in which a face pose naturally changes.

Figure 4:
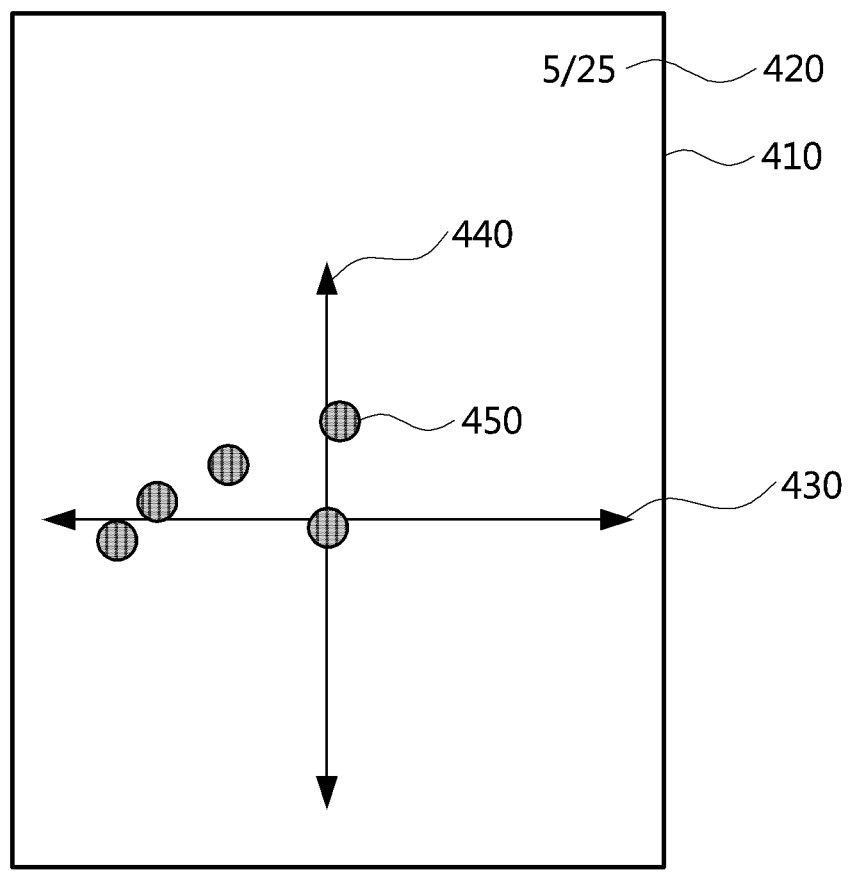
FIG. 4 is a view that shows an example of a face registration interface according to an embodiment of the present invention.

FIG. 4 is a view that shows an example of a face registration interface according to an embodiment of the present invention.

Referring to FIG. 4, when an operation mode is a face registration mode, the apparatus (110 in FIG. 1) for registering face poses for face recognition according to an embodiment of the present invention may provide a face registration interface 410. Particularly, the registration interface shown in FIG. 4 may be an example of application of an algorithm in which face information corresponding to an input face pose is registered as new face information when the difference between the input face pose and a registered face pose is greater than a threshold.

Here, the face registration interface 410 may show the number of pieces of face information registered up to the present and the number of pieces of face information that should be registered 420.

As shown in FIG. 4, the face registration interface 410 displays '5/25' in the top-right corner of the screen. Here, '5/25' represents information about the number of pieces of face information 420. That is, 25 pieces of face information can be registered, but five pieces of face information have been registered up to that point in time.

Here, the face registration interface 410 may show face poses 450, corresponding to registered pieces of face information, in the form of coordinates. Here, the horizontal axis 430 represents a yaw angle, and the vertical axis 440 represents a pitch angle.

That is, in order to represent the registered face poses 450, the face registration interface 410 may display a dot or marker at the point (coordinates) corresponding to the number of degrees by which the user's face is rotated up, down, to the left and to the right.

As described above, the face registration interface is provided as a Graphical User Interface (GUI), whereby a user may automatically register face information corresponding to various face poses merely by inputting images including successive face poses.

Figure 5:
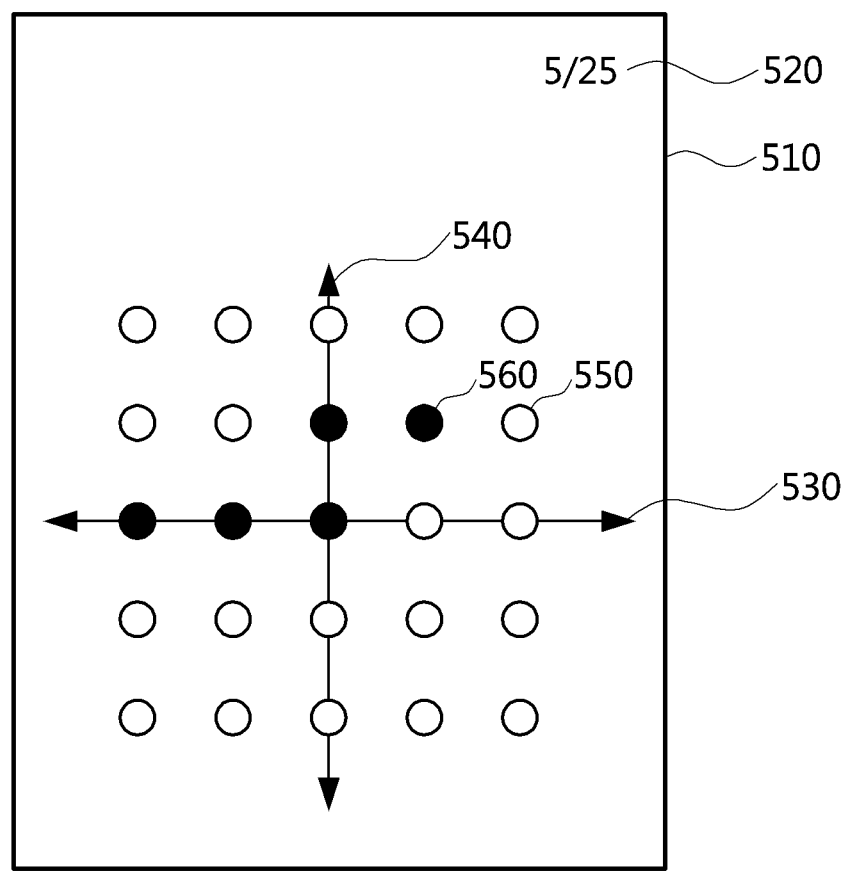
FIG. 5 is a view that shows an example of a face registration interface according to an embodiment of the present invention.

FIG. 5 is a view that shows an example of a face registration interface according to an embodiment of the present invention.

Referring to FIG. 5, when an operation mode is a face registration mode, the apparatus (110 in FIG. 1) for registering face poses for face recognition according to an embodiment of the present invention may provide a face registration interface 510. Particularly, the registration interface shown in FIG. 5 may be an example in which face poses to be registered are predefined.

Here, the face registration interface 510 may show the number of pieces of face information registered up to the present and the number of pieces of face information that should be registered 520.

As shown in FIG. 5, the face registration interface 510 displays '5/25' in the top-right corner of the screen. Here, '5/25' represents information about the number of pieces of face information 520. That is, 25 pieces of face information can be registered, but five pieces of face information have been registered up to that point in time.

Here, the face registration interface 510 may show face poses that have not yet been registered 550 and registered face poses 560 in the form of coordinates, among the predefined face poses that should be registered. Here, the horizontal axis 530 represents a yaw angle, and the vertical axis 540 represents a pitch angle.

Particularly, the face registration interface 510 may visibly display the already registered face poses 560, and may transparently display the face poses that should be registered but have not yet been registered so as be unobtrusive, or may not display the same.

For example, the face registration interface 510 may mark face pose points corresponding to the registered face poses 560 with a black dot or a marker, and may mark face pose points corresponding to the face poses that should be registered but have not yet been registered 550 with a white dot or a transparent circle having a colored rim. That is, the face registration interface 510 may mark the face pose points corresponding to the registered face poses 560 and the face pose points corresponding to the face poses that should be registered but have not yet been registered 550 respectively with dots or markers having different colors or shapes so that the user may easily distinguish them from each other.

For example, when some of target face poses that should be registered have not yet been registered, dots or markers are visibly marked at the coordinates corresponding to the corresponding face poses, whereby a user may know that the corresponding face poses have not yet been registered. Here, when face information corresponding to the unregistered face pose is registered, the dot or marker is deleted or changed, whereby the user may know that the corresponding face pose is registered.

Figure 6:
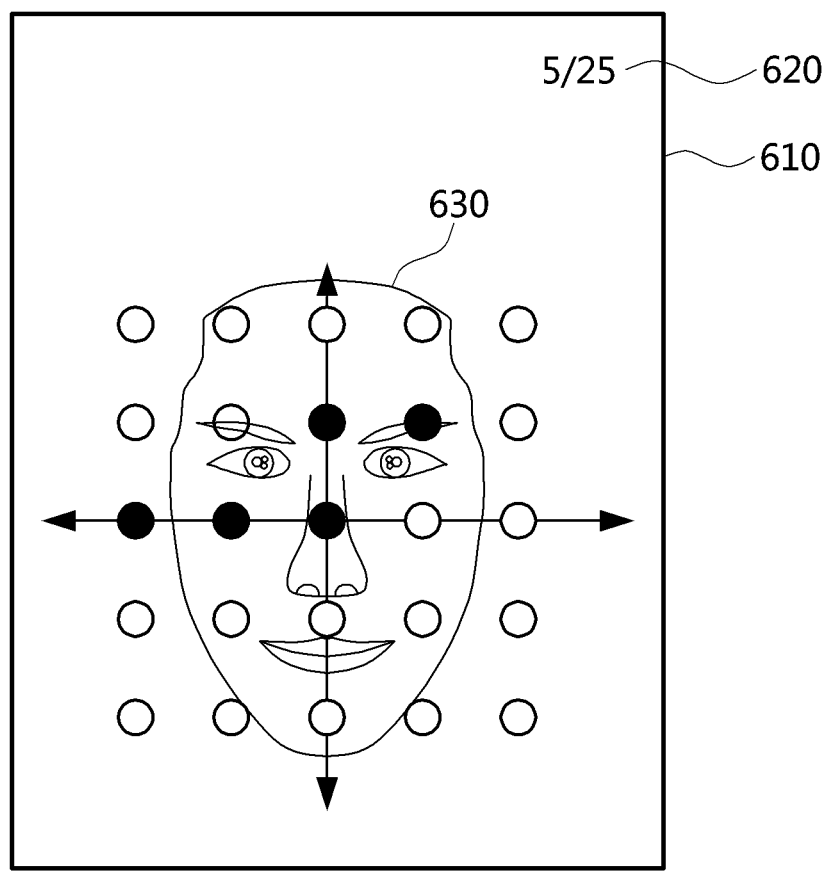
FIG. 6 is a view that shows an example of a face registration interface according to an embodiment of the present invention.

FIG. 6 is a view that shows an example of a face registration interface according to an embodiment of the present invention.

The face registration interface 610 shown in FIG. 6 additionally displays a user's face 630 included in an input image in the face registration interface 510 shown in FIG. 5.

Here, the face registration interface 610 may show the number of pieces of face information registered up to the present and the number of pieces of face information that should be registered 520.

As shown in FIG. 6, the face registration interface 610 displays '5/25' in the top-right corner of the screen. Here, '5/25' represents information about the number of pieces of face information 620. That is, 25 pieces of face information can be registered, but five pieces of face information have been registered up to that point in time.

Here, the face registration interface 610 may display the face pose corresponding to the user's face 630 included in the input image on a coordinate plane. For example, when the current user's face pose is (1 degree, 1 degree), a dot or marker may be marked at the corresponding coordinates.

The face pose points corresponding to the registered face poses 560 and the face pose points corresponding to the face poses that should be registered but have not yet been registered 550, illustrated in FIG. 5, are displayed along with the user's face 630 in FIG. 6.

For example, assuming that the coordinates of each face pose point represent a face pose taken when a full face is rotated up, down, to the right, or to the left by 1 degree, the face registration interface 610 shows that a face pose taken when the user's face is oriented straight ahead, a face pose taken when the user's face is rotated up by 1 degree, a face pose taken when the user's face is rotated up by 1 degree and to the left by 1 degree, a face pose taken when the user's face is rotated to the right by 1 degree, and a face pose taken when the user's face is rotated to the right by 2 degrees are registered.

As described above, because the face registration interface is provided, a user may easily check information about registered face poses and face poses that the user should register, and may easily perform a face registration process.

Figure 7:
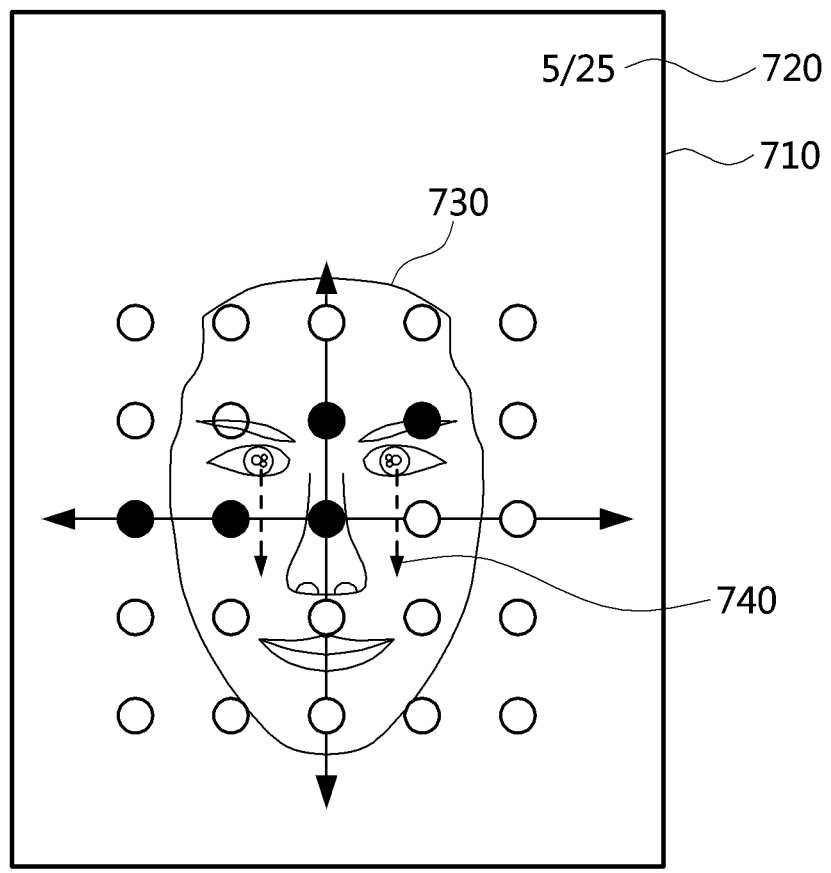
FIG. 7 is a view that shows an example of a face registration interface according to an embodiment of the present invention.

FIG. 7 is a view that shows an example of a face registration interface according to an embodiment of the present invention.

The face registration interface 710 shown in FIG. 7 additionally displays a face pose reference line 740 corresponding to a user's face 730 included in an input image in the face registration interface 610 shown in FIG. 6.

Here, the face registration interface 710 may show the number of pieces of face information registered up to the present and the number of pieces of face information that should be registered 720.

Here, the face registration interface 710 may display the face pose reference line 740, corresponding to the user's face 730 included in the input image, using a line, an arrow, and the like based on eyeballs.

As described above, because the face registration interface that visually displays a face pose reference line corresponding to the currently input face pose is provided, a user may easily check information about registered face poses and face poses that the user should register, and may more easily perform the face registration process by detecting the his or her current face pose.

Figure 8:
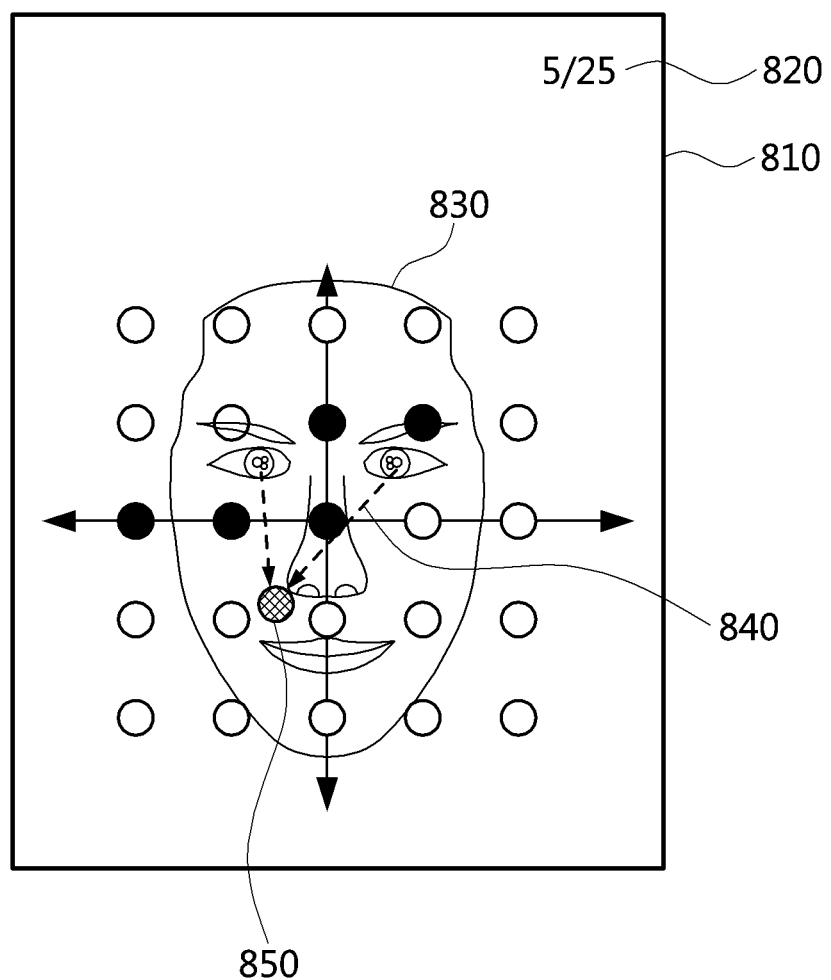
FIG. 8 is a view that shows an example of a face registration interface according to an embodiment of the present invention.

FIG. 8 is a view that shows an example of a face registration interface according to an embodiment of the present invention.

The face registration interface 810 shown in FIG. 8 additionally displays a marker 850 at the coordinates to which the face pose reference line 840, corresponding to a user's face included in an input image, points in the face registration interface 710 shown in FIG. 7.

Here, the face registration interface 810 may show the number of pieces of face information registered up to the present and the number of pieces of face information that should be registered 820.

Here, the face registration interface 810 may display the face pose reference line 840, corresponding to the user's face 830 included in the input image, using a line, an arrow, and the like based on eyeballs.

Here, the face registration interface 810 may display the marker 850 at the coordinates to which the face pose reference line 840 points on the coordinate plane.

Here, when the coordinates to which the face pose reference line 840, corresponding to the user's face, points match the face pose point corresponding to a face pose that should be registered but has not yet been registered in the face registration interface 810, the apparatus for registering face poses for face recognition may register the current face pose of the user at the corresponding face pose point.

As described above, because a face registration interface that visually displays a marker corresponding to the currently input face pose on a coordinate plane is provided, a user may easily check information about registered face poses and face poses that the user should register, and may more easily perform the face registration process by detecting the his or her current face pose.

Figure 9:
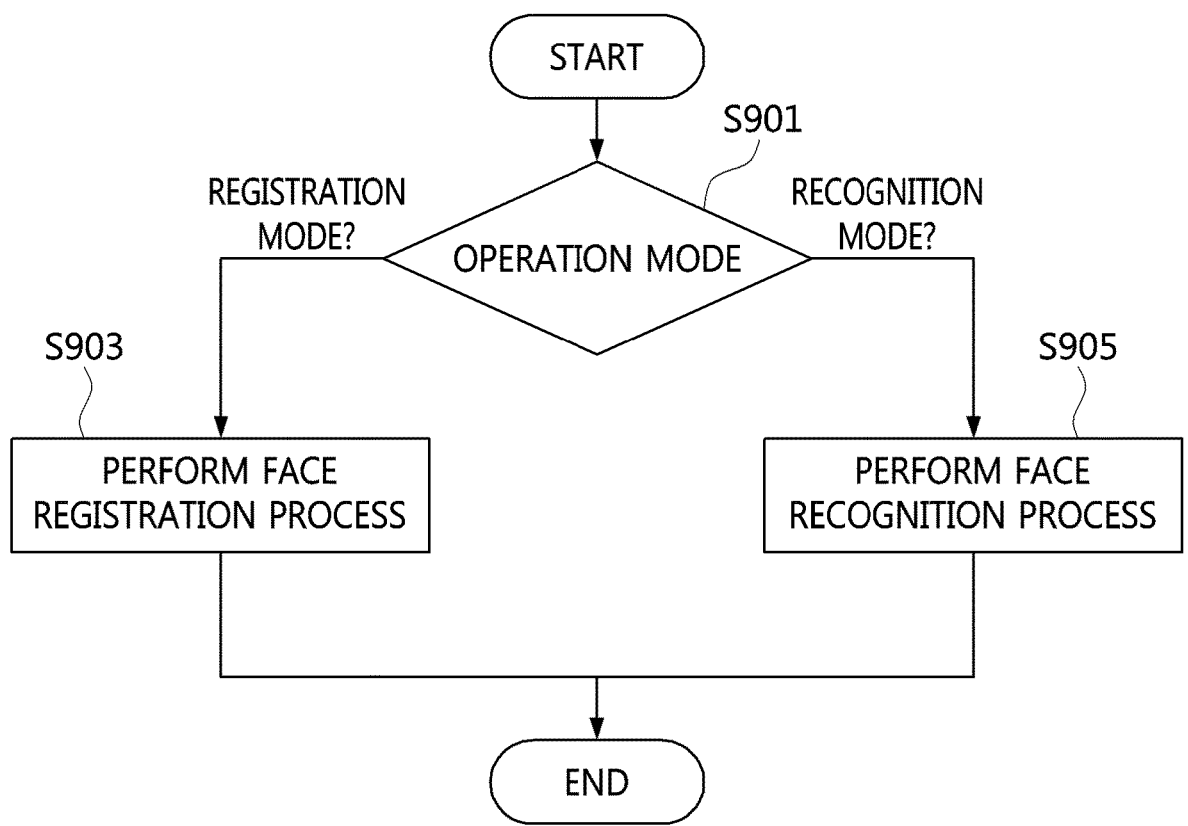
FIG. 9 is a flowchart that shows a method for registering face poses for face recognition according to an embodiment of the present invention.

FIG. 9 is a flowchart that shows a method for registering face poses for face recognition according to an embodiment of the present invention.

Referring to FIG. 9, in the method for registering face poses for face recognition according to an embodiment of the present invention, the apparatus (110 in FIG. 1) for registering face poses for face recognition determines an operation mode at step S901.

When it is determined at step S901 that the operation mode is a registration mode, the face information of a user is registered at step S903 by performing a face registration process.

When it is determined at step S901 that the operation mode is a recognition mode, whether the user is a registered user is determined at step S905 by performing a face recognition process.

Figure 10:
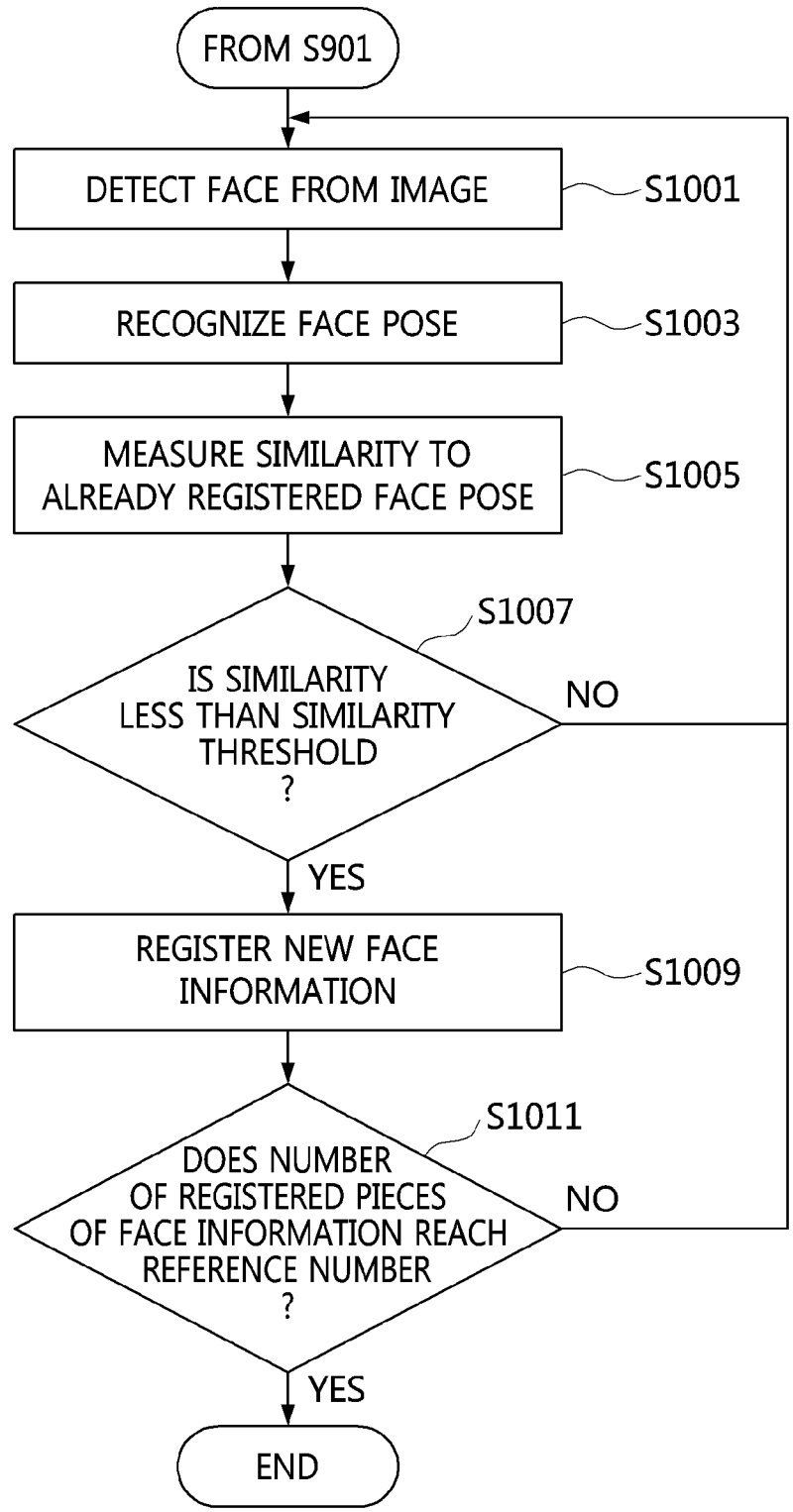
FIG. 10 is a flowchart that shows an example of the step of registering a face, illustrated in FIG. 9.

FIG. 10 is a flowchart that shows an example of the step (S903) of performing the face registration process illustrated in FIG. 9.

Referring to FIG. 10, in the step (S903) of performing the face registration process illustrated in FIG. 9, the apparatus (110 in FIG. 1) for registering face poses for face recognition detects the face of a user from an input image at step S1001.

Also, in the step (S903) of performing the face registration process illustrated in FIG. 9, the apparatus (110 in FIG. 1) for registering face poses for face recognition recognizes the face pose of the detected face at step S1003.

Here, the face pose may include the yaw angle and the pitch angle of the face.

Here, at step S1003, when the operation mode is a face registration mode, an interface for showing the progress of face registration to a user is generated and provided.

Here, at step S1003, an interface for showing information about whether or not the face poses of the face of a user are registered may be provided.

Here, at step S1003, face pose points indicating face poses, corresponding to a preset number of degrees by which the face of the user is rotated, may be displayed through the interface.

Here, at step S1003, the face pose points may be set on the coordinate plane such that the face pose points have a preset distance therebetween that is set based on the preset number of degrees by which the face of the user is rotated.

Here, at step S1003, whether or not face poses are registered may be shown through the interface by marking the face pose points corresponding thereto on the coordinate plane.

Here, at step S1003, a face pose point corresponding to a registered face pose may be marked with a first state in order to show that the corresponding face pose is registered and a face pose point corresponding to an unregistered face pose may be marked with a second state in order to show that the corresponding face pose has not yet been registered through the interface.

Here, the first or second state may correspond to the color, the shape, or the effect of a dot or a marker displayed on the coordinate plane, and the first state may have a different color, shape, or effect from the second state such that a user may easily distinguish the two states from each other.

Here, at step S1003, a face pose reference line that matches the line of sight of the user may be displayed through the interface based on information about the line of sight recognized from the face of the user.

Here, at step S1003, a target point to which the face pose reference line points may be marked with a third state on the coordinate plane through the interface.

Here, the third state may have a different color, shape, or effect such that a user may easily distinguish the third state from the first and second states.

Also, in the step (S903) of performing the face registration process illustrated in FIG. 9, the apparatus (110 in FIG. 1) for registering face poses for face recognition measures the similarity between the face pose of the input face image and a face pose corresponding to face information that is already registered in the current face registration process at step S1005. For example, if five pieces of face information are already registered in the current face registration process, the similarity between the face pose of the input face image and the face pose corresponding to each of the five pieces of face information may be measured.

Here, at step S1005, when a user moves the line of sight using the interface so that the target point comes close to a face pose point corresponding to an unregistered face pose within a preset distance, among the face pose points, the state with which the face pose point corresponding to the unregistered face pose is marked may be changed.

Here, at step S1005 when the state in which the target point is located close to the corresponding face pose point within the preset distance is maintained for a preset time period, the face pose of the user may be compared with a registered face pose using the similarity therebetween.

Here, at step S1007, the face pose of the user's face to be registered at the face pose point corresponding to the unregistered face pose is compared with the face pose of the user's face that is registered at the face pose point corresponding to the registered face pose using the similarity therebetween, and the face pose of the user's face may be registered at step S1009 only when the difference between the degree of rotation of the face pose to be registered and the degree of rotation of the registered face pose is equal to or greater than a preset threshold (that is, only when the similarity therebetween is less than a similarity threshold).

Here, at step S1009, the second state may be changed to the first state when the face pose of the user's face is registered at the face pose point corresponding to the unregistered face pose.

Also, in the step (S903) of performing the face registration process illustrated in FIG. 9, the apparatus (110 in FIG. 1) for registering face poses for face recognition determines whether all of the similarities measured at step S1005 are less than a similarity threshold at step S1007. Here, the number of similarities measured at step S1005 is equal to the number of pieces of face information registered in the current face registration process, and whether all of the similarities are less than the similarity threshold may be determined. This is for registering face information corresponding to a face pose that is not registered when the face pose differs from registered face poses by a certain degree.

When it is determined at step S1007 that any of the measured similarities is equal to or greater than the similarity threshold, the process returns to step S1001, whereby the face registration process is performed again.

When it is determined at step S1007 that all of the measured similarities are less than the similarity threshold, the face information acquired from the currently input image is registered as new face information at step S1009.

Here, the face information may include information about the face pose.

Also, in the step (S903) of performing the face registration process illustrated in FIG. 9, the apparatus (110 in FIG. 1) for registering face poses for face recognition determines whether the number of pieces of face information registered up to the present reaches a reference number at step S1011.

When it is determined at step S1011 that the number of pieces of face information registered up to the present does not reach the reference number, the process returns to step S1001, and the face registration process is performed again.

When it is determined at step S1011 that the number of pieces of face information registered up to the present reaches the reference number, the face registration process is terminated.

Accordingly, multiple pieces of face information of a user, in which face poses differ from each other by a certain degree, may be automatically and easily registered using an image including the face of the user.

Figure 11:
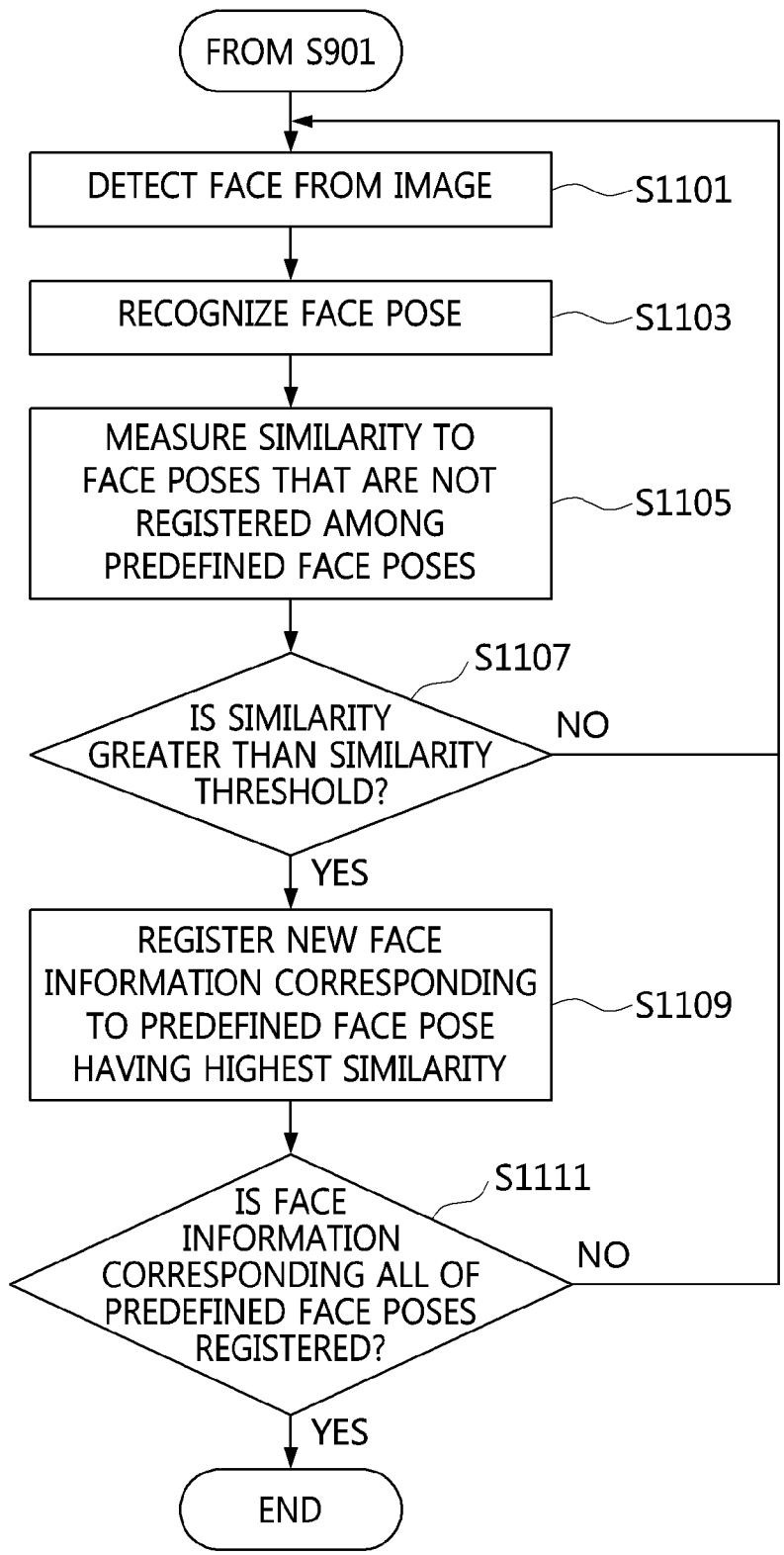
FIG. 11 is a flowchart that shows an example of the step of registering a face, illustrated in FIG. 9.

FIG. 11 is a flowchart that shows an example of the step (S903) of performing the face registration process illustrated in FIG. 9.

Referring to FIG. 11, in the step (S903) of performing the face registration process illustrated in FIG. 9, the apparatus (110 in FIG. 1) for registering face poses for face recognition detects the face of a user from an input image at step S1101.

Also, in the step (S903) of performing the face registration process illustrated in FIG. 9, the apparatus (110 in FIG. 1) for registering face poses for face recognition recognizes the face pose of the detected face at step S1103.

Here, the face pose may include the yaw angle and the pitch angle of the face.

Here, at step S1103, when the operation mode is a face registration mode, an interface for showing the progress of face registration to a user is generated and provided.

Here, at step S1103, an interface for showing information about whether or not the face poses of the face of a user are registered may be provided.

Here, at step S1103, face pose points indicating face poses, corresponding to a preset number of degrees by which the face of the user is rotated, may be displayed through the interface.

Here, at step S1103, the face pose points may be set on the coordinate plane such that the face pose points have a preset distance therebetween that is set based on the preset number of degrees by which the face of the user is rotated.

Here, at step S1103, whether or not face poses are registered may be shown through the interface by marking the face pose points corresponding thereto on the coordinate plane.

Here, at step S1103, a face pose point corresponding to a registered face pose may be marked with a first state in order to show that the corresponding face pose is registered and a face pose point corresponding to an unregistered face pose may be marked with a second state in order to show that the corresponding face pose has not yet been registered through the interface.

Here, the first or second state may correspond to the color, the shape, or the effect of a dot or a marker displayed on the coordinate plane, and the first state may have a different color, shape, or effect from the second state such that a user may easily distinguish the two states from each other.

Here, at step S1103, a face pose reference line that matches the line of sight of the user may be displayed through the interface based on information about the line of sight recognized from the face of the user.

Here, at step S1103, a target point to which the face pose reference line points may be marked with a third state on the coordinate plane through the interface.

Here, the third state may have a different color, shape, or effect such that a user may easily distinguish the third state from the first and second states.

Also, in the step (S903) of performing the face registration process illustrated in FIG. 9, the apparatus (110 in FIG. 1) for registering face poses for face recognition measures at step S1105 the similarities between the face pose of the user included in the input image and face poses that are not yet registered in the current face registration process, among predefined target face poses that should be registered. For example, when the number of predefined target face poses is nine and when four pieces of face information are registered, the similarities between the face pose of the input face image and the five target face poses that are not yet registered may be measured.

Here, at step S1105, when a user moves the line of sight using the interface so that the target point comes close to a face pose point corresponding to an unregistered face pose within a preset distance, among the face pose points, the state with which the face pose point corresponding to the unregistered face pose is marked may be changed.

Here, at step S1105, when the state in which the target point is located close to the corresponding face pose point within the preset distance is maintained for a preset time period, the face pose of the user may be compared with a registered face pose using the similarity therebetween.

Also, in the step (S903) of performing the face registration process illustrated in FIG. 9, the apparatus (110 in FIG. 1) for registering face poses for face recognition determines whether at least one of the similarities measured at step S1105 is greater than a similarity threshold at step S1107. Here, the number of similarities measured at step S1105 is equal to the number of pieces of face information that are not yet registered in the current face registration process, and it may be determined whether each of the similarities is greater than the similarity threshold. This is for registering face information corresponding to the face pose that is close to the predefined target face pose that is not yet registered.

When it is determined at step S1107 that all of the measured similarities are equal to or less than the similarity threshold, the process returns to step S1101, whereby the face registration process is performed again.

When it is determined at step S1107 that at least one of the measured similarities is greater than the similarity threshold, face information acquired from the currently input image is registered as new face information corresponding to the predefined target face pose of which the similarity is highest at step S1109.

Here, at step S1107, the face pose of the user's face to be registered at the face pose point corresponding to the unregistered face pose is compared with the face pose of the user's face that is registered at the face pose point corresponding to the registered face pose using the similarity therebetween, and the face pose of the user's face may be registered at step S1109 only when the difference between the degree of rotation of the face pose to be registered and the degree of rotation of the registered face pose is equal to or greater than a preset threshold (that is, only when the similarity therebetween is less than a similarity threshold).

Here, at step S1109, the second state may be changed to the first state when the face pose of the user's face is registered at the face pose point corresponding to the unregistered face pose.

Here, the face information may include information about the face pose.

Also, in the step (S903) of performing the face registration process illustrated in FIG. 9, the apparatus (110 in FIG. 1) for registering face poses for face recognition determines at step S1111 whether pieces of face information corresponding to all of the predefined target face poses are registered.

When it is determined at step S1111 that at least one of the pieces of face information corresponding to all of the predefined target face poses is not registered, the process returns to step S1101, whereby the face registration process is performed again.

When it is determined at step S1111 that all of the pieces of face information corresponding to all of the preset registration target face poses are registered, the face registration process is terminated.

Figure 12:
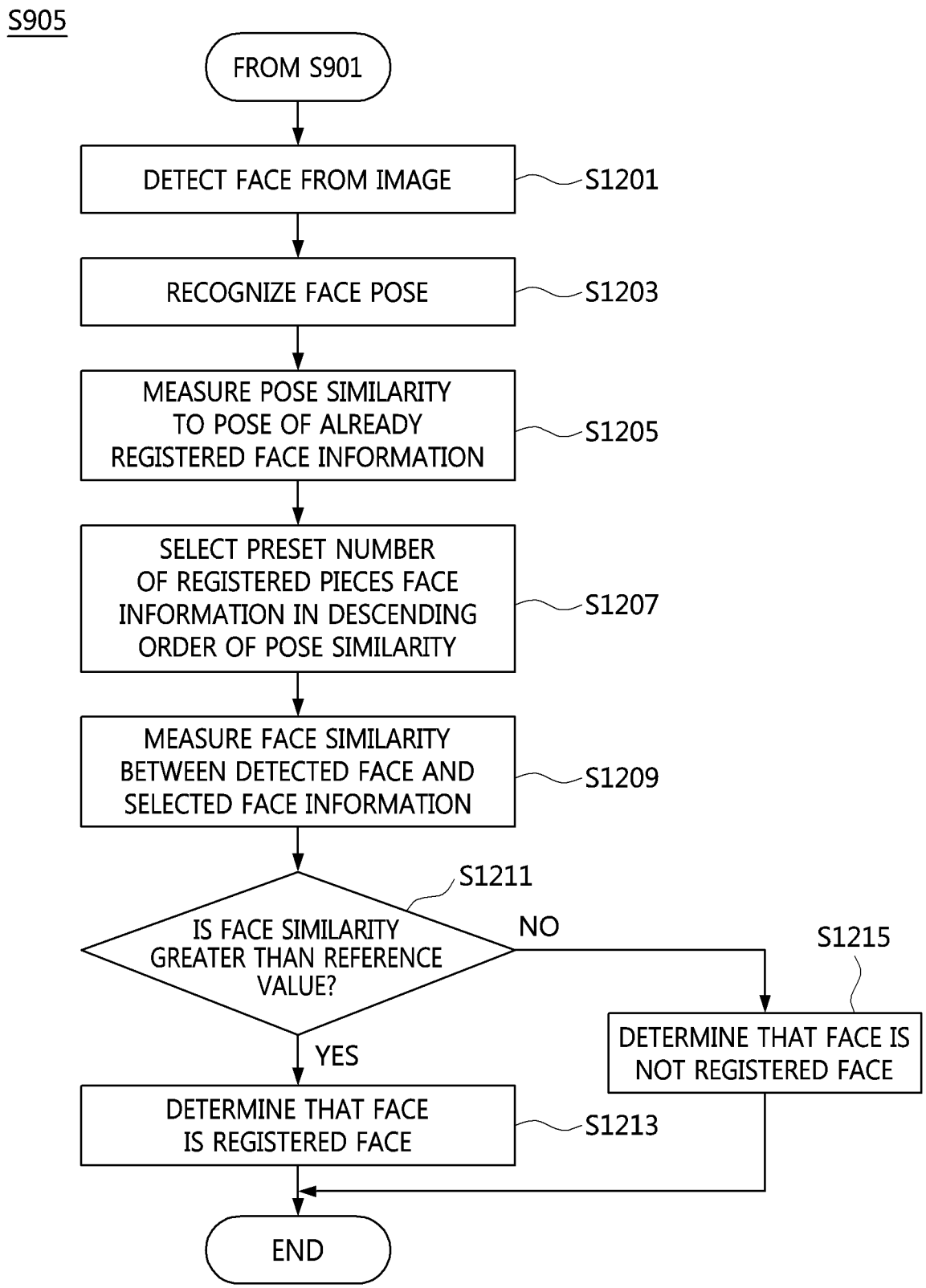
FIG. 12 is a flowchart that shows an example of the step of recognizing a face, illustrated in FIG. 9.

FIG. 12 is a flowchart that shows an example of the step (S905) of performing the face recognition process illustrated in FIG. 9.

Referring to FIG. 12, in the step (S905) of performing the face recognition process illustrated in FIG. 9, the apparatus (110 in FIG. 1) for registering face poses for face recognition detects the face of a user from an input image at step S1201.

Also, in the step (S905) of performing the face recognition process illustrated in FIG. 9, the apparatus (110 in FIG. 1) for registering face poses for face recognition recognizes the face pose of the detected face at step S1203.

Here, the face pose may include the yaw angle and the pitch angle of the face.

Also, in the step (S905) of performing the face recognition process illustrated in FIG. 9, the apparatus (110 in FIG. 1) for registering face poses for face recognition measures the pose similarity between the face pose recognized from the input image and the face pose of registered face information at step S1205.

Also, in the step (S905) of performing the face recognition process illustrated in FIG. 9, the apparatus (110 in FIG. 1) for registering face poses for face recognition selects a preset number of pieces of face information from registered pieces of face information arranged in descending order of pose similarity at step S1207. Here, the selected pieces of face information are the target face information to be compared with the user's face shown in the input image.

Here, at step S1207, all of pieces of face information that satisfy the condition in which the pose similarity between the face pose thereof and the face pose recognized from the input image is equal to or greater than a similarity threshold may be selected from the registered pieces of face information and used as the target face information to be compared with the user's face, rather than selecting a preset number of pieces of face information.

Here, the target face information to be compared is selected for each registered user. For example, when user A and user B are already registered, face information to be compared with the face of the user A is selected from pieces of face information registered for the user A, and face information to be compared with the face of the user B is selected from pieces of face information registered for the user B.

Also, in the step (S905) of performing the face recognition process illustrated in FIG. 9, the apparatus (110 in FIG. 1) for registering face poses for face recognition measures the face similarity between the face of the user detected from the input image and the selected face information at step S1209.

Also, in the step (S905) of performing the face recognition process illustrated in FIG. 9, the apparatus (110 in FIG. 1) for registering face poses for face recognition determines whether the measured face similarity is greater than a reference value at step S1211.

Here, the face similarities between the face of the user detected from the input image and the selected pieces of face information are measured, and whether the maximum value of the face similarities, the mean value thereof, the median value thereof, the weighted mean value thereof, or the combination thereof is greater than the reference value may be determined.

When it is determined at step S1211 that the measured face similarity is greater than the reference value, the detected face of the user is determined to be a registered face at step S1213. For example, when three pieces of face information are selected from registered pieces of face information based on the pose of the detected face of the user, when the face similarities between the detected face and the selected pieces of face information are 98%, 85% and 80%, and when the reference value is 95%, because the maximum value of the face similarities, which is 98%, is greater than the reference value of 95%, the user in the input image may be determined to be a registered user.

When it is determined at step S1211 that the measured face similarity is not greater than the reference value, the detected face of the user is determined to be a face that is not registered at step S1215.

As described above, no matter which face pose a user inputs, the pose similarity is measured by finding the face pose that is most similar to the input face pose, among registered face poses, whereby a face recognition result that is robust to pose variation may be acquired.

The conventional method for recognizing a face takes an approach in which a preset number of faces is randomly selected and successively registered, or an approach in which, after various face poses are displayed, a 3D face model is generated based thereon and registered. Here, the approach in which a preset number of faces is randomly selected and successively registered is not robust to face pose variation because the change in a face pose is not taken into account and faces in similar poses are successively registered. Also, in the case of the approach in which a 3D model is generated from face images captured at various angles, it is difficult to generate a perfect 3D model unless a precise 3D scanner is used. Furthermore, when a 3D model is generated so as to have the same face pose as the face pose shown in an input image, the 3D model image is generated many times so as to have a different pose from the actual pose, whereby face recognition performance is degraded.

In order to solve the problems with the conventional method, the present invention automatically registers multiple pieces (for example, 30 or more pieces) of face information corresponding to various face poses using images including a user when a face is registered and features are extracted therefrom. When a face shown in the currently input image is recognized, the similarity between the face to be recognized and the features corresponding to the pose that is similar to the currently input face pose is calculated. Accordingly, compared to the conventional face registration method, in which previously fixed pose information is used, a face may be recognized based on a plurality of registered images in which various natural poses are reflected. Also, as opposed to the method of using a synthesized 3D face model, because matching information between actual images is calculated, a face recognition result that is more robust to pose variation may be acquired. Also, the problem in which more storage space is required in order to register various face poses may be prevented by storing only feature vectors (for example, 256-dimensional feature vectors) of various poses for a face, excluding the frontal pose of the face. Also, the problem in which the processing time taken to recognize a face in various poses increases may be prevented by selecting face information corresponding to a face pose that is similar to the face pose shown in an input image and recognizing the face using only the selected information. Therefore, there is little increase in processing time in spite of recognition of various face poses.

The above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as a CD-ROM and a DVD, magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

Through the apparatus and method for registering face poses for face recognition according to an embodiment of the present invention, multiple pieces of face information are registered based on face poses, and a face is recognized using the face information, whereby face recognition capability that is robust to pose variation may be provided.

Also, through the apparatus and method for registering face poses for face recognition according to an embodiment of the present invention, multiple pieces of face information related to various face poses are acquired from images including a user and automatically registered, whereby the user may successively register multiple pieces of face information for face recognition more easily.

Also, through the apparatus and method for registering face poses for face recognition according to an embodiment of the present invention, because whether a face is a registered face is determined using information about a face pose that is similar to the face pose of a user shown in an input image, among a plurality of registered pieces of face information, a computational load may be effectively reduced even though multiple pieces of face information are stored, whereby face recognition capability that is more efficient and has high accuracy for various face poses may be provided.

Although specific embodiments have been described in the specification, they are not intended to limit the scope of the present invention. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:

1. An apparatus for registering face poses for face recognition, comprising:
 a face detection unit for detecting a face of a user from an image including the face of the user;

a pose recognition unit for recognizing a face pose of the face of the user based on a degree of rotation via a pitch and a yaw angles of the face of the user;
a registration interface unit for providing an interface for showing information about whether face poses of the face of the user are registered; and
a face registration unit for registering the face pose of the face of the user when the face pose of the face of the user is recognized as an unregistered face pose based on the interface,
wherein the registration interface unit changes from a first state indicator to a second state indicator when a face pose point corresponding to an unregistered face pose is marked, displays a face pose reference line that matches a line of sight of the user through the interface based on information about the line of sight recognized from the face of the user; and
wherein the face pose point corresponding to the unregistered face pose is marked among face pose points when a target point, to which the face pose reference line points, comes close to the face pose point corresponding to the unregistered face pose within a preset distance.

2. The apparatus of claim 1, wherein the registration interface unit displays the face pose points indicating face poses, corresponding to a preset number of degrees by which the face of the user is rotated, through the interface.

3. The apparatus of claim 2, wherein the registration interface unit sets the face pose points on a coordinate plane such that the face pose points have a preset distance therebetween that is based on the preset number of degrees by which the face of the user is rotated.

4. The apparatus of claim 3, wherein the registration interface unit shows whether or not face poses are registered by marking the face pose points corresponding thereto on the coordinate plane through the interface.

5. The apparatus of claim 4, wherein the registration interface unit marks another face pose point corresponding to a registered face pose with the first state indicator in order to show that the corresponding face pose is registered, and
wherein the first or second state indictor may correspond to a color, a shape, or an effect of a dot or a marker displayed on a coordinate plane, and the first state indicator may have a different color, shape, or effect from the second state indicator such that a user may easily distinguish the two state indicators from each other.

6. The apparatus of claim 5, wherein the face registration unit registers the face pose of the face of the user at the face pose point corresponding to the unregistered face pose when the second state indicator where the target point is located close to the corresponding face pose point within the preset distance is maintained for a preset time period.

7. The apparatus of claim 6, wherein the face registration unit compares the face pose of the face of the user to be registered at the face pose point corresponding to the unregistered face pose with the face pose of the face of the user that is registered at the face pose point corresponding to the registered face pose using a similarity therebetween and registers the face pose of the face of the user at the face pose point corresponding to the unregistered face pose only when a difference between the degree of rotation of the face pose to be registered and the degree of rotation of the face pose that is registered is equal to or greater than a preset threshold.

8. The apparatus of claim 7, wherein the registration interface unit changes the second state indicator to the first state indicator when the face pose of the face of the user is registered at the face pose point corresponding to the unregistered face pose.

9. A method for registering face poses for face recognition, performed by an apparatus for registering face poses for face recognition, comprising:
detecting a face of a user from an image including the face of the user;
recognizing a face pose of the face of the user based on a degree of rotation via a pitch and a yaw angles of the face of the user;
providing an interface for showing information about whether face poses of the face of the user are registered; and
registering the face pose of the face of the user when the face pose of the face of the user is recognized as an unregistered face pose based on the interface,
wherein the providing an interface changes from a first state indicator to a second state indicator when a face pose point corresponding to an unregistered face pose is marked,
wherein providing the interface display a face pose reference line that matches a line of sight of the user through the interface based on information about the line of sight recognized from the face of the user and marks a target point to which the face pose reference line points with a third state indicator on the coordinate plane through the interface, and
wherein the face pose point corresponding to the unregistered face pose is marked among face pose points when the target point comes close to the face pose point corresponding to the registered face pose within a present distance.

10. The method of claim 9, wherein providing the interface is configured to display the face pose points indicating face poses, corresponding to a preset number of degrees by which the face of the user is rotated, through the interface.

11. The method of claim 10, wherein providing the interface is configured to set the face pose points on a coordinate plane such that the face pose points have a preset distance therebetween that is based on the preset number of degrees by which the face of the user is rotated.

12. The method of claim 11, wherein providing the interface is configured to show whether or not face poses are registered by marking the face pose points corresponding thereto on the coordinate plane through the interface.

13. The method of claim 12, wherein providing the interface is configured to mark the face pose point corresponding to a registered face pose with the first state indicator in order to show that the corresponding face pose is registered, and
wherein the first or second state indictor may correspond to a color, a shape, or an effect of a dot or a marker displayed on a coordinate plane, and the first state indicator may have a different color, shape, or effect from the second state indicator such that a user may easily distinguish the two state indicators from each other.

14. The method of claim 13, wherein registering the face pose is configured to register the face pose of the face of the user at the face pose point corresponding to the unregistered face pose when the second state indicator where the target point is located close to the corresponding face pose point within the preset distance is maintained for a preset time period.

15. The method of claim 14, wherein registering the face pose is configured to change the second state indicator to the first state indicator when the face pose of the face of the user is registered at the face pose point corresponding to the unregistered face pose.

\* \* \* \* \*